Patented Aug. 31, 1937

2,091,433

UNITED STATES PATENT OFFICE 2,091,433

PRODUCTION OF DEXTROSE

Julian K. Dale, Decatur, Ill., assignor to A. E. Staley Manufacturing Company, Decatur, Ill., a corporation of Delaware No Drawing. Application February 14, 1935, Serial No. 6,481

2 Claims. (Cl. 127—46)

The present invention relates to the production of dextrose or grape sugar, and has particular reference to an improved process for the effective recovery of dextrose of high purity from impure dextrose solutions.

Dextrose is produced commercially by recovery from relatively impure solutions such as may result from the acid hydrolysis of an aqueous starch suspension. A major portion of the dextrose content of the solution may be recovered with a purity or dextrose content which ordinarily exceeds 99.5 per cent, and a number of processes for this purpose are known. The mother liquor or hydrol remaining after this initial separation of dextrose still contains a considerable quantity of dextrose which is difficult to separate due to the presence in a concentrated form of other reducing sugars and crystallization inhibiting impurities.

A principal object of my invention is the provision of an improved process for recovering a large percentage of high purity dextrose from impure solutions in an economically attractive manner.

An additional object is the provision of an improved process for recovering dextrose from impure solutions by combined physical and chemical operations.

A further object is the economical recovery of high purity dextrose from hydrol.

A still further object is to provide a process for recovering dextrose from hydrolyzed starch solutions by subjecting the solution in a concentrated form to physical crystallization and separation of a major portion of the dextrose and then reacting the resulting mother liquor or hydrol with a reagent capable of uniting with the residual dextrose therein to form a combination which will permit further separation of said residual dextrose.

These and other objects will be observed upon consideration of the following description.

In the commercial production of dextrose heretofore it has been customary to rely upon physical crystallization of the dextrose from converted starch solutions, the details of such physical separation being described in several publications, including Patents Nos. 1,471,347, 1,521,830 and 1,508,569. Generally, a heavy starch suspension is hydrolyzed by hydrochloric acid and neutralized and filtered to form a dextrose solution of around 90 purity. The hydrolyzed solution is concentrated in vacuum pans to a density of about 40° Baumé to produce a supersaturated solution which upon properly controlled cooling will result in the crystallization of a major portion of the dextrose in a readily purifiable form. This cooling involves a reduction of the temperature from about 140° F. to about 100° F., and the cooled solution is maintained at the optimum temperature for crystallization for a period sufficient to produce the proper yield of crystals. Customarily, the solution is properly seeded and slowly agitated during the crystallization period. Following the crystallization period, the magma is introduced into a centrifugal machine for elimination of the liquid hydrol or mother liquor. The various steps of this type of dextrose recovery are well known in the art and further specific description thereof is thought unnecessary.

The hydrol resulting from the above described process is a dark colored, bitter-tasting liquid having a purity of the order of 65 to 70, depending upon the completeness of the initial separation. A typical analysis of hydrol is as follows:

|  | Per cent |
|---|---|
| Water | 20.5 |
| Dextrose equivalent | 55.8 |
| Ash | 2.4 |
| Protein | 0.2 |
| Non-reducing carbohydrates | 21.1 |
| Specific rotation | +46.3 |

In order to increase the total yield of dextrose it is customary to reconcentrate, rehydrolyze and recrystallize the hydrol as described in Patents Nos. 1,673,187 and 1,704,037 thereby obtaining an additional crop of dextrose crystals. However, it is difficult by this repeated crystallization method to recover substantial amounts of dextrose of satisfactory purity. Usually, the purity of the dextrose obtained by physical crystallization from hydrol is considerably lower than the purity of the dextrose obtained from the original solution.

Several theories have been advanced in explanation of the difficulties encountered in recrystallizing hydrol. Apparently, there are several types of reducing sugars in hydrol broadly classifiable as sugars, but only one being crystallizable dextrose. It is possible that the other types of reducing sugar are comprised of complex condensation products of dextrose which will not crystallize in the ordinary manner. Also, the hydrol contains in a concentrated form certain crystallization inhibiting compounds which render physical separation difficult.

I have found that from the standpoints of economy and effective recovery of dextrose of high purity, considerably improved results may be obtained by combining with the initial physical crystallization step a further step in which there is added to the mother liquor or hydrol a reagent which will unite with the residual reducing sugar to form a combination capable of effective separation from the impure solution and purification. The reagent employed is one which has a selective chemical affinity for the dextrose as distinguished from the impurities of the solution. Ordinarily, it is preferred to employ in the second or chemical step of the process the well known reaction between sodium chloride and dextrose. This reaction has been known for at least a century, and has been employed variously for such purposes as testing urine solutions for the presence of dextrose, distinguishing dextrose from other types of sugars, and recovering dextrose from solutions. More recently, the reaction has been described by the investigator Matsuuva in the Bulletin of the Chemical Society of Japan (2, 1927), pages 44 to 48, and by Rach in U. S. Patent No. 1,825,603.

In accordance with my process, the hydrol, preferably after rehydrolysis, is mixed with sodium chloride until the proper degree of precipitation of the resulting dextrose-sodium chloride compound takes place. That is, the sodium chloride exerts a preferential reaction with the dextrose of the hydrol and forms a crystalline precipitate having the formula $(C_6H_{12}O_6)_2 \cdot NaCl \cdot H_2O$. In spite of the nature of the hydrol solution the dextrose-sodium chloride crystals are large, hard and so well formed as to permit ready separation from the magma by a centrifugal operation.

Crystalline dextrose hydrate of substantially the same purity as the major portion of dextrose initially separated by crystallization can be obtained from the double compound of dextrose and sodium chloride by a simple extraction with water under properly controlled conditions. Well over one-half the sugar in the salt compound may be recovered as pure crystalline dextrose hydrate in one extraction, the extract being returned to the process with no loss of dextrose.

For the purpose of explanation, reference may be had to operation of the chemical separation part of the process on a laboratory scale. One thousand grams of hydrol was diluted to 16.5° Bé. To this solution was added 29.6 grams of commercial muriatic acid, the equivalent to 1.1 per cent of the weight of the diluted hydrol. The resulting solution had a pH of 1.2. The acidified solution was heated in a pressure cooker for 30 minutes at 20 pounds pressure. After neutralization to a pH of 4.0, and filtration, the hydrol was mixed with 118 grams of sodium chloride. The salt-hydrol solution was evaporated to 43.5° Bé. (at 100° F.). Crystallization of the double compound of dextrose and salt began quickly and progressed rapidly. The resulting crystals were separated from the liquid phase by a centrifugal operation, including a wash with a fine spray of water. The yield of the dextrose-sodium chloride compound (containing 82 per cent dextrose) was 526 grams. The dextrose was separated from its coordinate compound with salt by a simple extraction with water and removal of the extract in a centrifugal machine. Sufficient water must be used to insure a fluid magma after the dextrose has crystallized and to hold the salt in solution. Too large a quantity of water will lower the dextrose yield due to solution of the sugar. Ordinarily, it is preferred to employ about 70 parts by weight of water to 100 parts by weight of the dextrose-salt compound. Dextrose exists in two forms, namely, the alpha and beta forms. The final solubility of dextrose is the solubility of an equilibrium mixture of the two forms. The true or initial solubility of the alpha form is only about one-third of the final or equilibrium solubility. Dextrose exists in the salt compound as alpha dextrose, and the double compound has a greater solubility than the initial solubility of the alpha dextrose. Therefore, when the double compound is stirred with sufficient water it quickly goes into solution, but as this solution is supersaturated with respect to the alpha form of dextrose, the sugar quickly crystallizes out, while the salt remains in solution. The temperature of the water used for extraction should be kept moderately low, as the rate of change of alpha dextrose to the beta form increases with increasing temperature. This mutarotation must be kept at a minimum if a good yield of crystalline alpha dextrose is to be obtained. At 80° F. only about 40 to 50 per cent of the dextrose in the compound will be recovered, while at 60° F. the yield may be from 60 to 65 per cent. When the dextrose-salt compound is stirred with water the temperature rapidly falls, due to the endothermic nature of the solution of the compound. However, crystallization of the alpha dextrose, which is exothermic, causes the temperature of the solution to rise and may even cause it to exceed the original temperature of the solution.

The time for the extraction of dextrose from the compound may vary considerably, but at higher temperatures should be made as short as possible to prevent undue quantities of the dextrose from going back into solution.

One thousand grams of the dextrose-salt compound, produced as described heretofore, was placed in a mixer supplied with a cooling jacket, and 700 c. c. of water at 60° F. was added. The mixer was started, and as the compound rapidly dissolved the temperature fell to about 50° F. Before complete solution of the compound, dextrose hydrate commenced to crystallize, this crystallization proceeding rapidly until a rather thick magma of crystals was produced. To prevent an undue rise in the temperature of the magma due to crystallization of the dextrose, a cooling bath was provided. After 15 minutes extraction, the massecuite or crystalline magma was placed in a centrifugal machine where the crystals of dextrose hydrate were readily separated from the mother liquor, a cold water wash being used thereafter. A yield of more than 65 per cent of the dextrose in the dextrose-salt compound was obtained, and this dextrose had a purity of 99.9.

The run-off from the centrifugal machine should be returned to the process, thereby effecting a continuous and repeated use of the salt without loss of dextrose. Preferably, this run-off is added to additional hydrol or hydrolyzed hydrol and the mixture then concentrated under vacuum to the proper consistency for reaction between the salt and the dextrose and for crystallization of the resulting compound.

The run-off from the centrifugal step in which the dextrose-salt compound is freed from the hydrol mother liquor may be discarded, or, it may serve as a new hydrol for further rehydrolysis and crystallization of additional quantities of the dextrose-salt compound.

By hydrolysis of the first hydrol, addition of salt, crystallization of the dextrose-salt compound, extraction of dextrose therefrom and return of the run-off from this extraction to the process, at least 50% of the solids in the original hydrol may be obtained as essentially pure crystalline dextrose.

By submitting the second hydrol or salt hydrol to a further rehydrolysis and similar process a further amount of crystalline dextrose may be obtained. The yield this time approximates 50% of the organic solids in the salt hydrol started with.

From the foregoing description it will be seen that by combining an initial physical recovery of the major portion of dextrose from the original solution before the impurities are of sufficient concentration to prevent a practical recovery of dextrose in a pure form, with a chemical process in which additional quantities of dextrose just as pure as the physically recovered dextrose are obtained, a complete process of particular advantage has been provided. Many changes in the process as described for purposes of illustration and explanation may be made without departing from the scope of the invention as defined by the appended claims.

I claim:

1. The process of producing dextrose, which comprises hydrolyzing starch to produce a dextrose solution, concentrating said solution, subjecting the concentrated solution to a physical crystallizing step to crystallize therefrom a substantial amount of dextrose and to form hydrol containing reducing sugar and impurities resistant to recovery by physical crystallization, separating the crystals so formed from the remaining hydrol, adding an inorganic salt to the remaining hydrol, thereby forming an insoluble compound of dextrose with the said salt, separating said compound, adding water to the compound, and thereby breaking it up to yield dextrose.

2. The process of producing dextrose, which comprises hydrolyzing starch to produce a dextrose solution, concentrating said solution, subjecting the concentrated solution to a physical crystallizing step to crystallize therefrom a substantial amount of dextrose and to form hydrol containing reducing sugar and impurities resistant to recovery by physical crystallization, separating the crystals so formed from the remaining hydrol, adding sodium chloride to the remaining hydrol, thereby forming an insoluble compound of dextrose with the sodium chloride, separating said compound, adding water to the compound and thereby breaking it up to yield dextrose.

JULIAN K. DALE.